(12) United States Patent
Dumitras et al.

(10) Patent No.: US 8,902,986 B2
(45) Date of Patent: *Dec. 2, 2014

(54) LOOK-AHEAD SYSTEM AND METHOD FOR PAN AND ZOOM DETECTION IN VIDEO SEQUENCES

(71) Applicant: Apple Inc., Cupertino, CA (US)

(72) Inventors: Adriana Dumitras, Sunnyvale, CA (US); Barin G. Haskell, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/949,808

(22) Filed: Jul. 24, 2013

(65) Prior Publication Data

US 2013/0308058 A1 Nov. 21, 2013

Related U.S. Application Data

(63) Continuation of application No. 12/685,464, filed on Jan. 11, 2010, now Pat. No. 8,625,671, which is a continuation of application No. 10/655,564, filed on Sep. 3, 2003, now Pat. No. 7,646,437.

(51) Int. Cl.

| | | |
|---|---|---|
| *H04N 9/64* | (2006.01) | |
| *H04N 19/527* | (2014.01) | |
| *H04N 5/14* | (2006.01) | |
| *H04N 19/142* | (2014.01) | |
| *H04N 19/139* | (2014.01) | |
| *H04N 19/61* | (2014.01) | |
| *H04N 19/543* | (2014.01) | |
| *H04N 19/102* | (2014.01) | |

(52) U.S. Cl.
CPC ......... *H04N 5/147* (2013.01); *H04N 19/00593* (2013.01); *H04N 5/145* (2013.01); *H04N 19/00163* (2013.01); *H04N 5/144* (2013.01); *H04N 19/00151* (2013.01); *H04N 19/00781* (2013.01); *H04N 19/00624* (2013.01); *H04N 19/00012* (2013.01)
USPC .................................................. 375/240.16

(58) Field of Classification Search
None
See application file for complete search history.

(56) References Cited

U.S. PATENT DOCUMENTS 6,052,414 A * 4/2000 Lee et al. ................. 375/240.16
6,670,963 B2 * 12/2003 Osberger ..................... 345/629

(Continued)

FOREIGN PATENT DOCUMENTS

| WO | 97/08266 | 3/1997 | |
|---|---|---|---|
| WO | 98/52356 A1 | 11/1998 | |
| WO | WO 98/52356 | * 11/1998 | ............... H04N 7/12 |

OTHER PUBLICATIONS

Bouthemy, Patrick et al., "A Unified Approach to Shot Change Detection and Camera Motion Characterization," IEEE Transactions on Circuits and Systems for Video Technology, vol. 9, No. 7, pp. 1030-1044, Oct. 1999.

(Continued)

*Primary Examiner* — Christopher S Kelley
*Assistant Examiner* — Christopher Findley
(74) *Attorney, Agent, or Firm* — Kenyon & Kenyon LLP

(57) ABSTRACT

A look-ahead system and method for pan and zoom detection in video sequences is disclosed. The system and method use motion vectors in a reference coordinate system to identify pans and zooms in video sequences. The identification of pans and zooms enables parameter switching for improved encoding in various video standards (e.g., H.264) and improved video retrieval of documentary movies and other video sequences in video databases or other storage devices.

33 Claims, 4 Drawing Sheets

(56) References Cited

U.S. PATENT DOCUMENTS

| | | |
|---|---|---|
| 6,735,253 B1 | 5/2004 | Chang et al. |
| 7,027,513 B2 * | 4/2006 | Zhang et al. ............. 375/240.16 |
| 2001/0017890 A1 | 8/2001 | Rhee |

OTHER PUBLICATIONS

Dufaux, Frederick et al. "Efficient, Robust, and Fast Global Motion Estimation for Video Coding," IEEE Transactions on Image Processing, vol. 9, No. 3, pp. 497-501, Mar. 2000.

Guler, S., "Scene and content analysis from multiple video streams," Applied Imagery Pattern Recognition Workshop, AIPR 2001 30th Oct. 10-12, 2001 pp. 119-125.

Jozawa, H. et al., "Two-Stage Motion Compensation Using Adaptive Global MC and Local Affine MC," IEEE Transactions on Circuits and Systems for Video Technology, vol. 7, No. 1, pp. 75-85, Feb. 1997.

MPEG and ITU-T, "Joint Final Committee Draft of Joint Video Specification ISO/IEC/JTC1/SC29/WG11 (MPEG) 14496-10 and ITU-T Rec. H.264," Geneva, 242 pages, Oct. 2002.

Rath, Gagan et al., "Iterative Least Squares and Compression Based Estimations for a Four-Parameter Linear Global Motion Model and Global Motion Compensation," IEEE Transactions on Circuits and Systems for Video Technology, vol. 9, No. 7, pp. 1075-1099, Oct. 1999.

Tan, YP et al. "Rapid Estimation of Camera Motion from Compressed Video with Application Video Annotation," IEEE Transactions on Circuits and Systems for Video Technology, vol. 10, No. 1, pp. 133-146, Feb. 2000.

Tse, Y.T.; Baker, R.L., "Global zoom/pan estimation and compensation for video compression," Acoustics, Speech, and Signal Processing, 1991, ICASSP-91, 1991 International Conference on Apr. 14-17, 1991, vol. 4, pp. 2725-2728.

* cited by examiner

LOOK-AHEAD SYSTEM AND METHOD FOR PAN AND ZOOM DETECTION IN VIDEO SEQUENCES

CROSS-REFERENCE TO RELATED APPLICATIONS

This application is a continuation of U.S. patent application Ser. No. 12/685,464, filed on Jan. 11, 2010, which is a continuation of U.S. patent application Ser. No. 10/655,564, filed on Sep. 3, 2003, now U.S. Pat. No. 7,646,437, which is incorporated herein by reference in its entirety.

TECHNICAL FIELD

The invention relates generally to analysis of motion in video sequences and, more particularly, to identifying pan and zoom global motion in video sequences.

BACKGROUND

The analysis of motion information in video sequences has typically addressed two largely non-overlapping applications: video retrieval and video coding. In video retrieval systems, the dominant motion, motion trajectories and tempo are computed to identify particular video clips or sequences that are similar in terms of motion characteristics or belong to a distinct class (e.g., commercials). In video coding systems, global motion parameters are estimated for global motion compensation and for constructing sprites. In both video retrieval and video coding systems, it is desirable to identify pan and zoom global motion. For video retrieval systems, pan and zoom detection enables classification of video sequences (e.g., documentary movies) for efficient retrieval from video databases. For video coding systems, pan and zoom detection enables the adaptive switching of coding parameters (e.g., the selection of temporal and spatial Direct Modes in H.264).

Previous methods for detecting pan and zoom global motion in video sequences require estimating parameters of global motion, i.e., motion such that most of the image points are displaced in a uniform manner. Because the motion of many image points in a video frame is described by a small set of parameters related to camera parameters, estimating global motion parameters is a more constrained case than the estimation of motion parameters in all image points. The number of parameters obtained depends on the global motion model that is assumed to best describe the motion in the video sequence, for example, translational, affine, perspective, quadratic, etc., yielding 2, 6, 8 and 12 parameters, respectively. In particular, a perspective motion model yields the estimated coordinates $\hat{x}$, $\hat{y}$ using the old coordinates $x_i$, $y_i$ and the equations:

$$\hat{x}_i = (a_0 + a_2 x_i + a_3 y_i)/(a_6 x_i + a_7 y_i + 1) \quad (1)$$

$$\hat{y}_i = (a_1 + a_4 x_i + a_5 y_i)/(a_6 x_i + a_7 y_i + 1) \quad (2)$$

where $a_0 \ldots a_7$ are the motion parameters. Other models can be obtained as particular cases of the perspective model. For example, if $a_6 = a_7 = 0$, the affine model (six parameters) is obtained, if $a_2 = a_5$, $a_3 = a_4 = a_6 = a_7 = 0$, the translation-zoom model (three parameters) is obtained, and if $a_2 = a_5 = 1$, $a_3 = a_4 = a_6 = a_7 = 0$, the translational model (two parameters) is obtained.

Global motion estimation can be formulated as an optimization problem, where the error between a current frame and a motion compensated previous frame is minimized. Techniques such as gradient descent and second order optimization procedures have been applied iteratively to solve the optimization problem. In Hirohisa Jozawa, et al., "Two-stage Motion Compensation Using Adaptive Global MC and Local Affine MC," *IEEE Trans. on Circuits and Systems for Video Tech.*, Vol. 7, No. 1, pp. 75-82, February 1997, global motion parameters are estimated using a two-stage motion compensation process. In the first stage, global motion is estimated and a global motion compensated picture is obtained. In the second stage, the global motion compensated picture is used as a reference for local motion compensation. The local motion compensation is performed both for the global motion compensated reference image and for the image without global motion compensation using an affine motion model in the framework of the H.263 standard.

Other techniques for estimating global motion in video sequences have also been proposed. A technique proposed in Frederic Dufaux et al., "Efficient, Robust and Fast Global Motion Estimation for Video Coding," *IEEE Trans. on Image Processing*, Vol. 9, No. 3, pp. 497-510, March 2000, includes a three-stage process. In a first stage, a low pass image pyramid is constructed by successive decompositions of the original picture. In a second stage, an initial estimation is performed, followed by a refining of the initial estimate, using gradient descent-based in a third stage. A perspective model with eight parameters has been used in this technique to model camera motion.

In Gagan B. Rath, et al., "Iterative Least Squares and Compression Based Estimation for a Four-Parameter Linear Global Motion Model and Global Motion Compensation," *IEEE Trans. on Circuits and Systems for Video Tech.*, Vol. 9, No. 7, pp. 1075-1099, October 1999, a four-parameter model for global motion is employed for pan and zoom motion estimation. This technique uses iterative least squares estimation to accurately estimate parameters.

In Patrick Bouthemy, et al., "A Unified Approach to Shot Change Detection and Camera Motion Characterization," *IEEE Trans. on Circuits and Systems for Video Tech.*, Vol. 9, No. 7, pp. 1030-1040, October 1999, a unified approach to shot change detection and camera motion characterization is proposed. By using an affine motion model, global motion parameters are estimated and at the same time, the evolution of scene cuts and transitions is evaluated.

In Yap-Peng, et al., "Rapid Estimation of Camera Motion from Compressed Video With Application to Video Annotation," *IEEE Trans. on Circuits and Systems for Video Tech.*, Vol. 10, No. 1, pp. 133-146, February 2000, camera motion parameters are estimated from compressed video, where macroblocks from P frames are used to estimate the unknown parameters of a global motion model.

All of the conventional methods described above require estimating global motion parameters to identify a specific type of global motion (e.g., pan, zoom or other). To estimate global motion, however, these conventional methods employ a generic motion model having global motion parameters that must be estimated. These global motion parameters are not necessary, however, for retrieving video sequences from databases. Nor are these global motion parameters necessary for parameter switching in video coding systems. Therefore, the conventional methods described above for estimating global motion increase unnecessarily the computational complexity of the application systems that employ such techniques.

Video retrieval systems can benefit from pan and zoom detection, which would allow identification of documentary movies and other sequences in video databases. Documentary movies include, for example, long panning clips that have a typical length of at least 10 seconds (i.e., 240 frames for a frame rate of 23.976 fps). These long panning clips are often preceded or followed by zooms on scenes or objects of interest. Pan and zoom clips are also present in numerous other types of sequences, from cartoons and sports games to home videos. It is therefore of interest to retrieve video clips and sequences having common pan or zoom characteristics.

Pan and zoom detection in video sequences can also enhance the capabilities of an encoder in a standards compliant system. It is well-known that encoders that are compliant with the MPEG and ITU standards may be unconstrained in terms of analysis methods and parameter values selections, as well as various coding scenarios for given applications, as long as the resulting compressed bit streams are standards-compliant (i.e., can be decoded by any corresponding standardized decoder). The objective of performing various enhancements at the encoder side is bit rate reduction of the compressed streams while maintaining high visual quality in the decoded pictures. An example of such enhancement is the selection of temporal and spatial Direct Modes described in the H.264 video coding standard.

In H.264, each frame of a video sequence is divided into pixel blocks having varying size (e.g., 4×4, 8×8, 16×16). These pixel blocks are coded using motion compensated predictive coding. A predicted pixel block may be an Intra (I) pixel block that uses no information from preceding pictures in its coding, a Unidirectionally Predicted (P) pixel block that uses information from one preceding picture, or a Bidirectionally Predicted (B) pixel block that uses information from one preceding picture and one future picture. The details of H.264 can be found in the publicly available MPEG and ITU-T, "Joint Final Committee Draft of Joint Video Specification ISO/IEC/JTC1/SC29/WG11 (MPEG) 14496-10 and ITU-T Rec. H.264," Geneva, October 2002, which is incorporated by reference herein in its entirety.

For each pixel block in a P picture, a motion vector is computed. Using the motion vector, a prediction pixel block can be formed by translation of pixels in the aforementioned previous picture. The difference between the actual pixel block in the P picture and the prediction block is then coded for transmission. Each motion vector may also be transmitted via predictive coding. That is, a prediction is formed using nearby motion vectors that have already been sent, and then the difference between the actual motion vector and the prediction is coded for transmission. For each B pixel block, two motion vectors are typically computed, one for the aforementioned previous picture and one for the future picture. From these motion vectors, two prediction pixel blocks are computed, which are then averaged together to form the final prediction. The difference between the actual pixel block in the B picture and the prediction block is then coded for transmission. Each motion vector of a B pixel block may be transmitted via predictive coding. That is, a prediction is formed using nearby motion vectors that have already been transmitted, then the difference between the actual motion vector and the prediction is coded for transmission.

With B pixel blocks, however, the opportunity exists for interpolating the motion vectors from those in the co-located or nearby pixel blocks of the stored pictures. Note that when decoding a B slice, there exist two lists (list 0 and list 1) of reference pictures stored in the decoded picture buffer. For a pixel block in a B slice, the co-located pixel block is defined as a pixel block that resides in the same geometric location of the first reference picture in list 1 or nearby pixel blocks of the stored pictures. The former case is known as the temporal-direct mode. The latter case is known as the spatial direct mode. In both of these cases, the interpolated value may then be used as a prediction and the difference between the actual motion vector and the prediction coded for transmission. Such interpolation is carried out both at the coder and decoder. In some cases, the interpolated motion vector is good enough to be used without any correction, in which case no motion vector data need be sent. Note that the prediction error of a pixel block or subblock, which is computed as the mean square error between the original pixel block and the decoded pixel block after encoding using direct mode is still transformed, quantized and entropy encoded prior to transmission. This is referred to as Direct Mode in H.264 (and H.263). Direct Mode selection is particularly effective when the camera is slowly panning across a stationary background. Indeed, the interpolation may be good enough to be used as is, which means that no differential information need be transmitted for these B pixel block motion vectors. Therefore, for such sequences that allow good motion vector predictions using neighboring temporal or spatial information, the Direct Mode can provide important bit rate savings.

Accordingly, there is a need for a system and method for pan and zoom detection in video sequences that enable classification of video sequences (e.g., documentary movies) in video retrieval systems and adaptive switching of coding parameters (e.g., selection of temporal and spatial Direct Modes in H.264) video coding systems, without performing the computationally intensive task of estimating all the parameters of a global motion model.

SUMMARY

The present invention overcomes the deficiencies of the prior art by providing a look-ahead system and method for pan and zoom detection in video sequences based on motion characteristics.

One aspect of the present invention includes a method of detecting pan and zoom in a video sequence. The method comprises selecting a set of frames from a video sequence (e.g., by identifying scene cuts), determining a set of motion vectors for each frame in the set of frames, identifying at least two largest regions in each frame in the frame set having motion vectors with substantially similar orientation in a reference coordinate system (e.g., polar coordinates), determining percentages of each frame covered by the at least two largest regions, determining a statistical measure (e.g., variance) of the motion vector orientations in the reference coordinate system for at least one of the two largest regions, and comparing the percentages and statistical measure to threshold values to identify a pan or zoom in the video sequence.

Another aspect of the present invention includes a system for detecting pan and zoom sequences in a video sequence. The system comprises: a preprocessor for selecting a set of frames from a video sequence, and a motion analyzer for determining a motion vector for each frame in the set of frames, identifying the two largest regions in each frame having motion vectors with substantially similar orientation in a reference coordinate system, determining percentages of each frame covered by the two largest regions, determining a statistical measure of the motion vector orientations in the reference coordinate system for at least one of the two largest regions, and comparing the percentages and statistical measure to threshold values to identify a pan or zoom in the video sequence.

The present invention as defined by the claims herein provides a computationally efficient solution for identifying pans and zooms in video sequences, including but not limited to the enabling of parameter switching for improved encoding in video standards (e.g., H.264) and improved video retrieval of video sequences from databases and other video storage devices.

DETAILED DESCRIPTION

While the embodiments described below include a video retrieval system and a video encoder (with parameter switching capability), the present invention is equally applicable to any video systems that employ pan and/or zoom detection to perform for a particular application.

Video Retrieval Application

Figure 1:
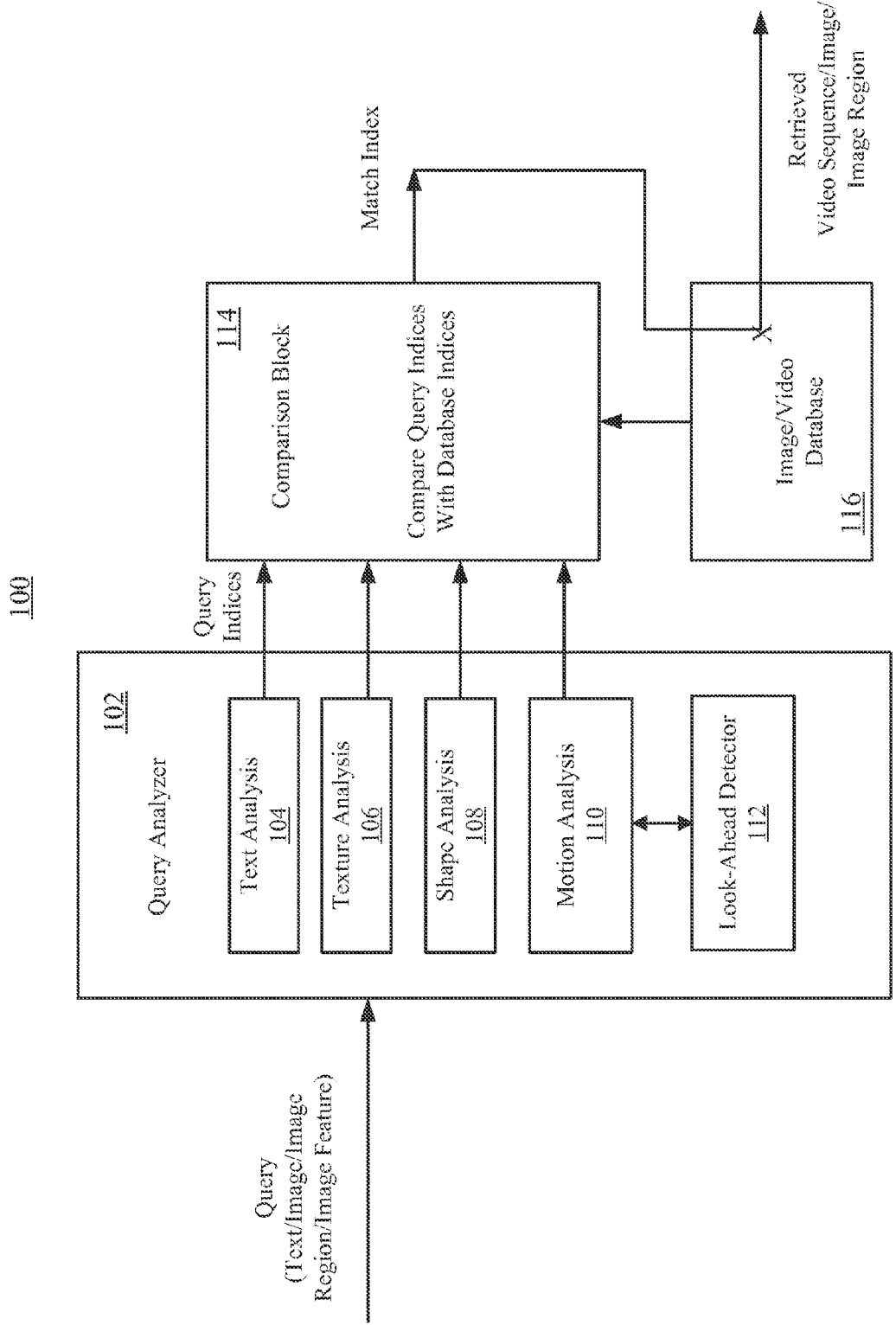
FIG. 1 is a block diagram of a video retrieval system, in accordance with one embodiment of the present invention.

FIG. 1 is a block diagram of a video retrieval system 100, in accordance with one embodiment of the present invention. The video retrieval system 100 includes a query analyzer 102, a comparison block 114 and an image database 116. The query analyzer 102 includes one or more analysis blocks, including but not limited to a text analysis block 104, a texture analysis block 106, a shape analysis block 108, a motion analysis block 110 and a look-ahead detector 112. In one embodiment, the analysis blocks 104, 106, 108, 110, and the look-ahead detector 112, are implemented as software instructions stored on a computer-readable medium and executed by one or more processors in the video retrieval system 100.

The query analyzer 102 receives one or more queries (e.g., text, images, image regions, image features, etc.) and analyzes the queries with one or more of the analysis blocks 104, 106, 108 and 110. For example, the text analysis block 104 analyzes text queries, the texture analysis block 106 analyzes textures, the shape analysis block 108 analyzes shapes and the motion analysis block 110 analyzes motion. The motion analysis block 110 also provides motion vectors to the look-ahead detector 112. The look-ahead detector 112 uses the motion vectors to perform pan and zoom detection in accordance with the present invention. The query analyzer 102 provides query indices to the comparison block 114, which compares the query indices with database indices provided by the image/video database 116. If there is a match between a query index and a database index, then the comparison block 114 generates a match index, which is used to retrieve a video sequence, image or image region from the image/video database 116.

The video retrieval system 100 uses the look-ahead detector 112 to identify pans and zooms in video sequences for improved retrieval of video sequences, such as documentaries. More particularly, the look-ahead detector 112 transforms block-based motion vectors from the motion analysis block 110 to polar coordinates to detect pan and zoom sequences without computing global motion parameters. The various steps performed by the look-ahead detector 112 are described more fully with respect to FIG. 3.

Video Coding Application

Figure 2:
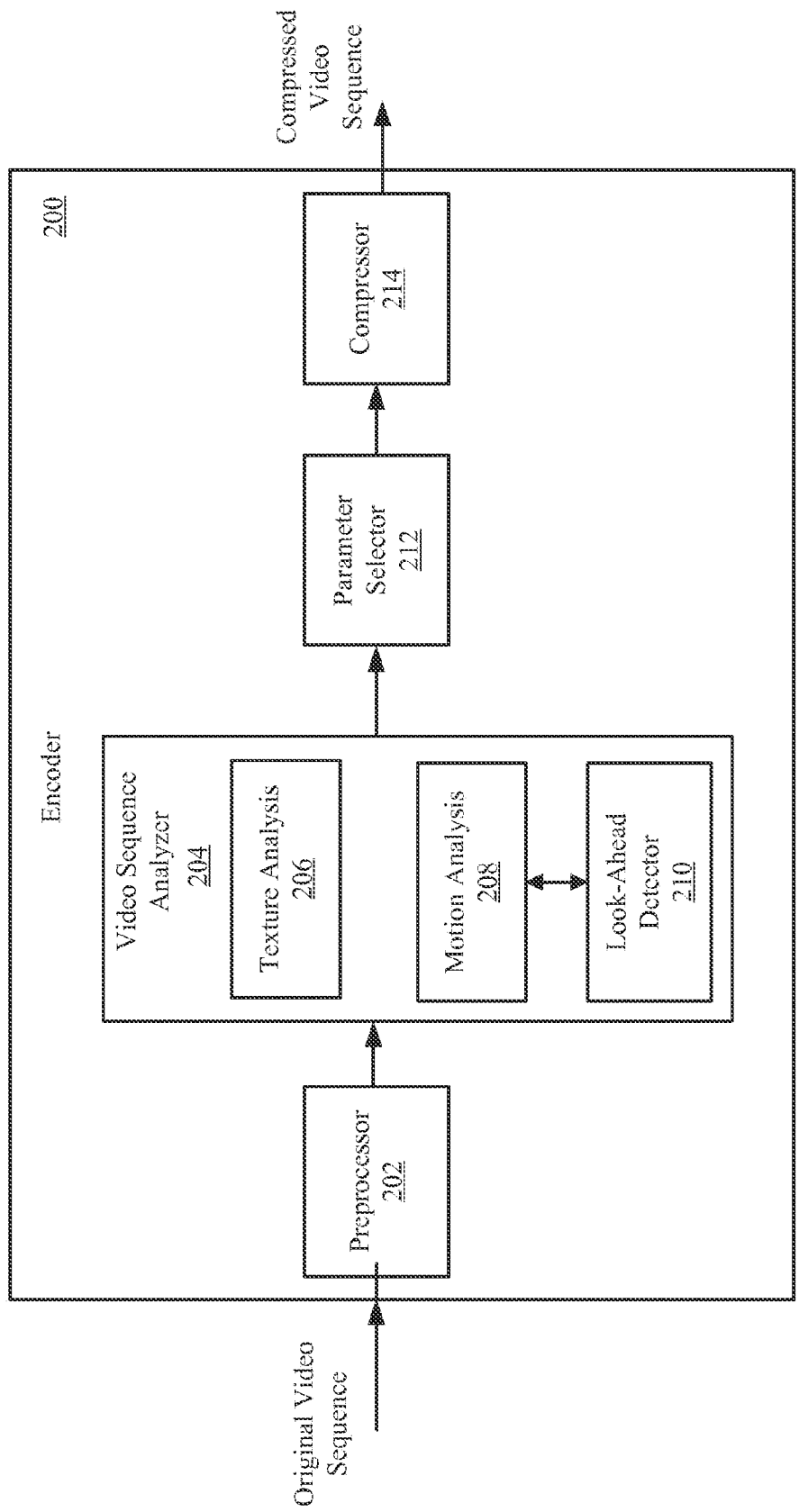
FIG. 2 is a block diagram of a video encoder, in accordance with one embodiment of the present invention.

FIG. 2 is a block diagram of a video encoder 200, in accordance with one embodiment of the present invention. The video encoder 200 includes a preprocessor 202, a video sequence analyzer 204, a parameter selector 212 and a compressor 214. The video sequence analyzer 204 includes a text analysis block 206, a motion analysis block 208 and a look-ahead detector 210. The look-ahead detector 210 is coupled to the motion analysis block 208 and receives motion vectors from the motion analysis block 208. In one embodiment, the analysis blocks 204, 206, 208, and the look-ahead detector 210, are implemented as software instructions stored on a computer-readable medium and executed by one or more processors.

In normal operation, the preprocessor 202 may perform tasks such as color space conversions, spatial, temporal or spatio-temporal filtering, or down sampling. The texture analysis block 206 performs a texture analysis for each macroblock and the motion analysis block 208 performs motion analysis for each macroblock. The video sequence analyzer 204 provides data (e.g., pan or zoom detection signals) to the parameter selector 212, which provides parameter switching for improved encoding (e.g., adaptive switching of temporal and spatial direct modes in H.264).

Pan and Zoom Detection

Figure 3:
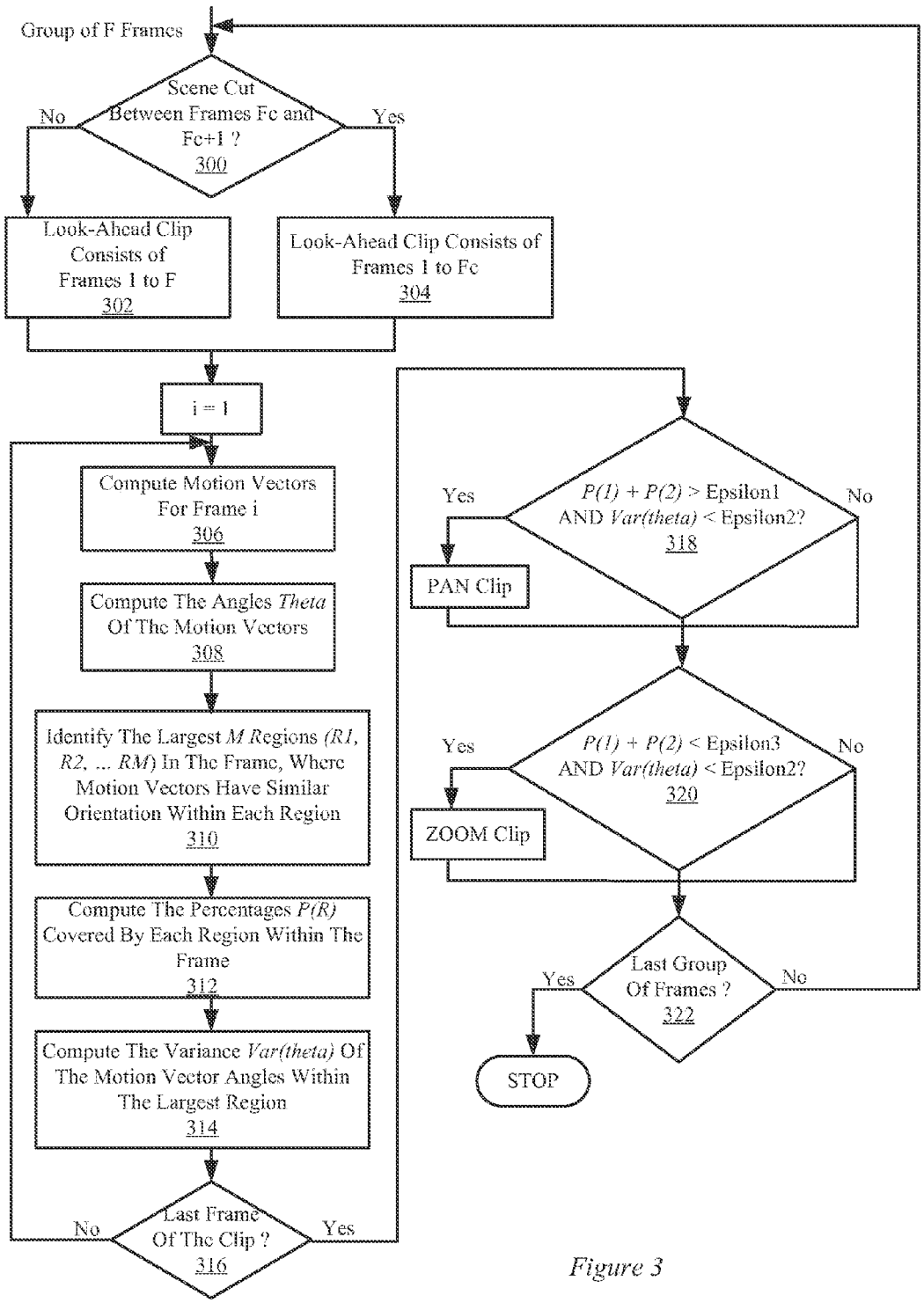
FIG. 3 is a flow diagram of a look-ahead method for pan and zoom detection in video sequences, in accordance with one embodiment of the present invention.

FIG. 3 is a flow diagram of a look-ahead method for pan and zoom detection in video sequences, in accordance with one embodiment of the present invention. For each group of F frames, a look-ahead video clip is determined 300 by identifying a first scene cut between a first and the Fth frame of a group of frames. Various methods have been employed to identify scene cuts in video sequences. For simplicity, this embodiment of the present invention makes use of frame differences and motion information to identify a scene cut. In one embodiment of the present invention, if the relative difference between two adjacent frames with respect to the first of these frames is larger than a predetermined threshold (e.g. 20%) or if the motion vectors in the second of these frames are equal to zero, then a scene cut is identified. If a scene cut is identified between frames $F_c$ and $F_c+1$, then the look-ahead video clip includes 302 frames from the first frame to the frame $F_c$. If there exists no scene cut, then the look-ahead video clip includes 304 frames from the first frame of the group frames to the Fth frame.

For each frame of the look-ahead video clip, motion vectors are computed 306 using, e.g., 8×8 macroblocks to make use of block-based motion information to characterize global motion in the video sequence. In one embodiment, motion vector data (e.g., one motion vector for each 8×8 block) is obtained by motion estimation using techniques such as those disclosed in the publicly available H.264 standard (e.g., reference H.264 encoder version 6.1). Note that other block sizes can be used with the present invention depending upon the application and motion estimation method using various block sizes (e.g., 4×4, 16×16 pixels).

The angle theta of each of the motion vectors is computed 308 in polar coordinates (r, θ), where r is the modulus and theta is the angle of a motion vector. More specifically, the angle θ of a motion vector is given by:

$$\theta = a\tan\left(\frac{y}{x}\right), \quad (3)$$

where (x, y) are the Cartesian coordinates (displacements) on the x, y directions, respectively. Preferably, the value of theta is normalized between 0 and 1. Note that other reference coordinate systems can be use with the present invention, such as Cartesian, spherical, cylindrical and the like.

Next, the two largest regions in each frame containing motion vectors with similar orientation (e.g., values for theta are substantially similar) are identified 310. Mathematically, the regions $R_k^{(1)}$ and $R_k^{(2)}$ are given by the following equations:

$$R_k^{(1)} = \{(i,j), 1 \leq i \leq M, 1 \leq j \leq N | \theta(i,j) \approx \text{const.} \quad (4)$$

and $$A_k^{(1)} = \max_{\text{all} A_m \text{ in frame } k} \{A_m\}\} \quad (5)$$

$$R_k^{(2)} = \{(i,j), 1 \leq i \leq M, 1 \leq j \leq N | \theta(i,j) \approx \text{const.} \quad (6)$$

and $$A_k^{(2)} = \max_{\text{all} A_m \backslash A_1 \text{ in frame } k} \{A_m\}\} \quad (7)$$

where (i,j) are the locations of pixels in a frame, M, N are the width and height of a frame, $A_k^{(1)}$ and $A_k^{(2)}$ are the areas (e.g., in number of pixels) of the first and second largest regions $R_k^{(1)}$ and $R_k^{(2)}$, respectively, which contain motion vectors having similar orientation based on the values for theta computed using Equation (3).

Figure 4:
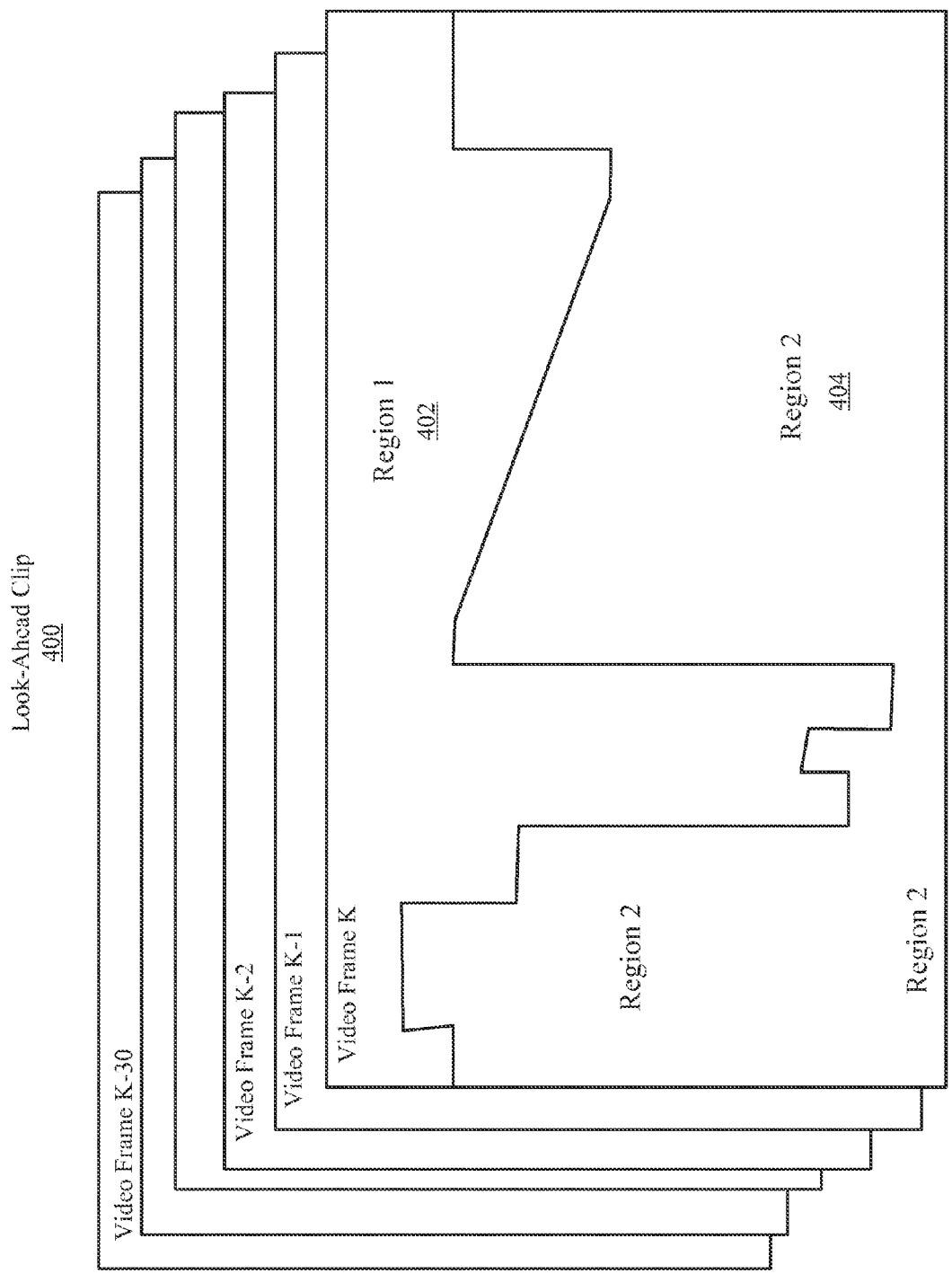
FIG. 4 illustrates the identification of the two largest regions in a video frame k, which form part of a look-ahead video clip, in accordance with one embodiment of the present invention.

FIG. 4 illustrates pan and zoom detection in a frame k in a look-ahead video clip 400 comprising multiple frames. The frame k includes first and second largest regions 402, 404, which correspond to $R_k^{(1)}$ and $R_k^{(2)}$ in equations (4) and (6) above.

Next, the percentages covered by the regions $R_k^{(1)}$ and $R_k^{(2)}$ within each frame are computed 312 and the variance of the $\theta$ values in the first largest region $R_k^{(1)}$ of each frame is computed 314. More specifically, the percentages $P_k^{(1)}$ and $P_k^{(2)}$ covered within each frame by the regions $R_k^{(1)}$ and $R_k^{(2)}$ with similar orientation of the motion vectors are given by $$P_k^{(1)} = A_k^{(1)} \times 100/(M \times N), P_k^{(2)} = A_k^{(2)} \times 100/(M \times N), \quad (8)$$

where $A_k^{(1)}$ is the area (e.g., in number of pixels) of the first largest region $R_k^{(1)}$ and $A_k^{(2)}$ is the area (e.g., in the number of pixels) of the second largest region $R_k^{(2)}$ with motion vectors having similar orientation (e.g., substantially similar theta values). The variance of the theta values within the first largest region $R_k^1$ is given by $$\text{var}^{(1)}(\theta) = \{\text{var}(\theta) | \theta \in R_k^1\} \quad (9)$$

The above steps are repeated for each frame in the look-ahead video clip until the last frame of the video clip is reached 316. Note the variance of the theta values within the second largest region $R_k^{(2)}$ can also be computed instead of the theta values for $R_k^1$, but this is unnecessary for the present invention. The percentages and variances computed in the previous steps are then tested 318 to identify if a pan video clip is present and tested 320 to identify if a zoom video clip is present in the video clip, as follows:

$$\text{If } ((P_k^{(1)} + P_k^{(2)}) > \epsilon_1) \text{ and } \text{var}^{(1)}(\theta) < \epsilon_2, \text{ then pan,} \quad (10)$$

$$\text{If } ((P_k^{(1)} + P_k^{(2)}) < \epsilon_3) \text{ and } \text{var}^{(1)}(\theta) < \epsilon_2, \text{ then zoom,} \quad (11)$$

where one exemplary set of threshold values $\epsilon_1$, $\epsilon_2$ and $\epsilon_3$ are determined experimentally to be equal to $\epsilon_1 = 0.95$, $\epsilon_2 = 0.01$, and $\epsilon_3 = 0.5$. Note that these threshold values can be adjusted as desired to increase or decrease the number of possible pan and zoom detections. The preceding steps 300 to 322 are repeated until the last group of frames is reached 322, and then a new group of frames is processed.

Because the present invention does not compute global motion parameters, it provides a simpler and more computationally efficient system and method for pan and zoom detection than conventional systems and methods, which require the computation of global motion parameters for a global motion model.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. An encoder for detecting at least one of a pan and a zoom in a video sequence, the encoder comprising:
   one or more processors adapted to receive the video sequence; and
   a memory adapted to store one or more programs for execution by the one or more processors, the one or more programs including instructions for:
   analyzing motion vectors to detect a scene cut within the video sequence;
   selecting a set of frames from the video sequence in response to detection of a scene cut;
   identifying at least two regions in each selected frame, a first region having motion vectors of a first orientation and a second region having motion vectors of a second orientation;
   determining amounts of each frame covered by each of the at least two regions; and
   comparing the detected amounts to threshold values; and
   classifying the video sequence as having a pan or zoom based on the comparisons.

2. The encoder of claim 1, wherein a pan or zoom classification is applied to generate one or more query indices.

3. The encoder of claim 2, wherein the one or more query indices are compared to media indices stored in a media database, and if a query index matches a media index, media corresponding to the media index is retrieved.

4. The encoder of claim 1, wherein a pan or zoom classification is applied to enable adaptive switching of coding parameters.

5. The encoder of claim 1, wherein a pan or zoom classification is applied to determine selection of temporal or spatial direct modes of video coding standard H.264.

6. The encoder of claim 1, further comprising a compressor adapted to process the received video sequence and output a compressed video sequence.

7. The encoder of claim 1, wherein the motion vectors are derived pursuant to video coding standard H.264.

8. The encoder of claim 1, wherein selecting set of frames from the video sequence responsive to detection of the scene cut comprises:
   selecting a set of video frames from the video sequence includes all the frames in the video sequence up to and including a frame just before the detected scene cut.

9. The encoder of claim 1, wherein frame differences and motion vectors of the video sequence are used to detect a scene cut.

10. The encoder of claim 1, wherein the motion angles are computed in one from the group of coordinate systems consisting of polar, Cartesian, spherical and cylindrical coordinate systems.

11. The encoder of claim 1, wherein the amounts of each frame covered by the at least two regions are determined from the number of pixels in each region as a percentage of the total number of pixels in a frame.

12. A computer-implemented method for detecting at least one of a pan and a zoom in a video sequence, the method comprising:
- receiving, at a processor, the video sequence;
- analyzing motion vectors to detect a scene cut within the video sequence;
- selecting a set of frames from the video sequence in response to detection of a scene cut;
- identifying at least two regions in each selected frame, a first region having motion vectors of a first orientation and a second region having motion vectors of a second orientation;
- determining amounts of each frame covered by each of the at least two regions; and
- comparing the detected amounts to threshold values; and
- classifying the video sequence as having a pan or zoom based on the comparisons.

13. The method of claim 12, wherein a pan or zoom classification is applied to generate one or more query indices.

14. The method of claim 13, wherein the one or more query indices are compared to media indices stored in a media database, and if a query index matches a media index, media corresponding to the media index is retrieved.

15. The method of claim 12, wherein a pan or zoom classification is applied to enable adaptive switching of coding parameters.

16. The method of claim 12, wherein a pan or zoom classification is applied to determine selection of temporal or spatial direct modes of video coding standard H.264.

17. The method of claim 12, further comprising compressing, by a compressor, the received video sequence and outputting a compressed video sequence.

18. The method of claim 12, wherein the motion vectors are derived pursuant to video coding standard H.264.

19. The method of claim 12, wherein selecting set of frames from the video sequence responsive to detection of the scene cut comprises:
- selecting a set of video frames from the video sequence includes all the frames in the video sequence up to and including a frame just before the detected scene cut.

20. The method of claim 12, wherein frame differences and motion vectors of the video sequence are used to detect a scene cut.

21. The method of claim 12, wherein the motion angles are computed in one from the group of coordinate systems consisting of polar, Cartesian, spherical and cylindrical coordinate systems.

22. The method of claim 12, wherein the amounts of each frame covered by the at least two regions are determined from the number of pixels in each region as a percentage of the total number of pixels in a frame.

23. A non-transitory computer readable storage medium storing one or more programs configured to be executed by a processor, the one or more programs comprising instructions for:
- receiving, at a processor, the video sequence;
- analyzing motion vectors to detect a scene cut within the video sequence;
- selecting a set of frames from the video sequence in response to detection of a scene cut;
- identifying at least two regions in each selected frame, a first region having motion vectors of a first orientation and a second region having motion vectors of a second orientation;
- determining amounts of each frame covered by each of the at least two regions; and
- comparing the detected amounts to threshold values; and
- classifying the video sequence as having a pan or zoom based on the comparisons.

24. The computer readable storage medium of claim 23, wherein a pan or zoom classification is applied to generate one or more query indices.

25. The computer readable storage medium of claim 24, wherein the one or more query indices are compared to media indices stored in a media database, and if a query index matches a media index, media corresponding to the media index is retrieved.

26. The computer readable storage medium of claim 23, wherein a pan or zoom classification is applied to enable adaptive switching of coding parameters.

27. The computer readable storage medium of claim 23, wherein a pan or zoom classification is applied to determine selection of temporal or spatial direct modes of video coding standard H.264.

28. The computer readable storage medium of claim 23, further comprising compressing, by a compressor, the received video sequence and outputting a compressed video sequence.

29. The computer readable storage medium of claim 23, wherein the motion vectors are derived pursuant to video coding standard H.264.

30. The computer readable storage medium of claim 23, wherein selecting set of frames from the video sequence responsive to detection of the scene cut comprises:
- selecting a set of video frames from the video sequence includes all the frames in the video sequence up to and including a frame just before the detected scene cut.

31. The computer readable storage medium of claim 23, wherein frame differences and motion vectors of the video sequence are used to detect a scene cut.

32. The computer readable storage medium of claim 23, wherein the motion angles are computed in one from the group of coordinate systems consisting of polar, Cartesian, spherical and cylindrical coordinate systems.

33. The computer readable storage medium of claim 23, wherein the amounts of each frame covered by the at least two regions are determined from the number of pixels in each region as a percentage of the total number of pixels in a frame.

* * * * *